United States Patent
Wohlleb

(10) Patent No.: US 8,593,006 B2
(45) Date of Patent: Nov. 26, 2013

(54) WIND TURBINE BRAKING DEVICE AND METHOD OF USE DAMPING DRIVETRAIN OSCILLATION

(75) Inventor: Matthias Wohlleb, Würselen (DE)

(73) Assignee: Siemens Aktiengesellschaft, München (DE)

( * ) Notice: Subject to any disclaimer, the term of this patent is extended or adjusted under 35 U.S.C. 154(b) by 66 days.

(21) Appl. No.: 13/348,666

(22) Filed: Jan. 12, 2012

(65) Prior Publication Data

US 2012/0187683 A1 Jul. 26, 2012

(30) Foreign Application Priority Data

Jan. 24, 2011 (EP) .................................. 11151847

(51) Int. Cl.
*F03D 7/02* (2006.01)

(52) U.S. Cl.
USPC .................... 290/44; 322/58; 416/14; 416/32

(58) Field of Classification Search
USPC ............ 290/44, 55; 322/58; 415/4.1; 416/14, 416/32, 35
See application file for complete search history.

(56) References Cited

U.S. PATENT DOCUMENTS

| | | | |
|---|---|---|---|
| 7,518,344 | B2 | 4/2009 | Sihler |
| 2009/0230681 | A1 | 9/2009 | Scholte-Wassink |
| 2009/0295161 | A1 | 12/2009 | Steiner |
| 2010/0207396 | A1* | 8/2010 | Simon ............................ 290/55 |
| 2011/0135465 | A1* | 6/2011 | Braicks ............................ 416/1 |

FOREIGN PATENT DOCUMENTS

| | | |
|---|---|---|
| CN | 2826073 Y | 10/2006 |
| DE | 102007040834 A1 | 3/2009 |
| DE | 102009011084 A1 | 6/2010 |
| DE | 102009006054 A1 | 7/2010 |
| EP | 2119910 A1 | 11/2009 |
| EP | 1972822 B1 | 4/2010 |
| WO | WO 2007140787 A1 | 12/2007 |

* cited by examiner

*Primary Examiner* — Vanessa Girardi

(57) ABSTRACT

A method for the oscillation damping of a drive train in a wind turbine is proposed. The drive train connects a rotor to a generator. Parameter values representing an oscillation of the drive train are calculated and, on the basis of the calculated parameter values, damping forces which counteract the oscillation of the drive train are exerted in a controlled manner on the drive train by a braking device.

13 Claims, 5 Drawing Sheets

WIND TURBINE BRAKING DEVICE AND METHOD OF USE DAMPING DRIVETRAIN OSCILLATION

CROSS REFERENCE TO RELATED APPLICATIONS

This application claims priority of European Patent Office application No. 11151847.8 filed Jan. 24, 2011, which is incorporated by reference herein in its entirety.

FIELD OF INVENTION

The present invention relates to a method for the oscillation damping of a drive train in a wind turbine, which drive train connects a rotor to a generator. It further relates to such a wind turbine and to the specific use of a braking device in such a wind turbine.

BACKGROUND OF INVENTION

In a wind turbine the kinetic energy of the wind is used for the purpose of producing rotational movement in a rotor. This rotational movement is transmitted via a drive train to a generator which generates electrical energy from the rotational energy.

Due to the transmission of force from the rotor to the generator and due to further influences (see below), the drive train and the wind turbine components surrounding it are exposed to a multiplicity of forces, which result in oscillations, i.e. vibrations in the drive train. In this context, it is possible essentially to distinguish between axial oscillations, which therefore propagate along the axis or plurality of axes of the drive train, and radial oscillations, which travel transversely relative to this axis or axes. Such oscillations have a number of causes:

Firstly, external factors such as e.g. the wind speed, the wind direction, the external temperature or turbulence play a role. These factors of influence exert forces on the rotor, not all of which act in an axial direction of the drive train or the axis of the rotor. This results in mainly low-frequency oscillations of up to approximately 10 Hz in the drive train.

Secondly, a complex overall system consisting of numerous mechanically-interconnected components works during operation of the wind turbine. For example, provision is often made for a speed-transforming gear which transforms the relatively slow rotation of the rotor or a first shaft of the drive train into a faster rotation of a second shaft of the drive train. Vibrations (i.e. torsional oscillations) automatically occur in this gear due to the connection of the two drive train components by means of toothed gearwheels or other elements for the transmission of force. Torsional forces are also transmitted from the gear onto the machine housing, i.e. onto the internal structure of the cabin. Moreover, the gear also produces axial oscillations, mainly in the high-frequency range above 10 Hz.

Thirdly, pitch and yawing moments are produced by constraining forces in connections between the cabin and components that are mounted in the cabin. These constraining forces occur as a result of the assembly, as a result of weight distribution, and due to excitation of the natural frequencies of the drive train. The pitch and yawing moments in the drive train produce forces which act on the subfloor in the cabin of the wind turbine and can damage this. The natural frequency of an individual component is dependent on its weight and/or its inertia in this case. By combining a system of components during the assembly, new system characteristics and hence new natural frequencies are produced.

Further oscillations can be induced as a result of a second shaft being arranged, relative to the rotor, behind such a speed-transforming gear, wherein a braking device is attached to said second shaft and wherein said second shaft leads towards the generator via a coupling in a posterior region of the cabin. This coupling can be used to realize e.g. a compensation of levels in the direction of the generator, this being mounted lower or higher than the speed-transforming gear. This coupling can also cause oscillations during operation.

The oscillations and force effects in the region of the drive train as summarized here in the form of an overview represent a problem during operation of the wind turbine, because they can significantly reduce the service life of the wind turbine as a whole, or individual components thereof, and/or permanently jeopardize their functionality. In particular, high frequency oscillations above approximately 10 Hz can cause significant damage at high amplitudes, primarily in the gear, in the generator and to the cabin of the wind turbine. They often continue along the whole drive train and can even be amplified by the transformation in a gear. The VDI specification VDI 3834, whose disclosure contents are explicitly considered to be part of the present application, sets forth the principles for the measurement and evaluation of mechanical oscillations of wind turbines and their components. It contains inter alia limits that should as far as possible not be exceeded for loads caused by vibrations.

The cited oscillations and forces can be equalized by means of various countermeasures, such that as far as possible no constraining forces are transmitted from the gear or the drive train onto the cabin. For example, the drive train is currently mounted elastically on the housing of the cabin. This mounting is effected e.g. by means of a three-point or four-point mounting, which therefore comprises an elastic sprung connection between the subfloor and the drive train or the speed-transforming gear at three or four points of the drive train. In this context, the drive train can be fully or partially surrounded at at least one point along its longitudinal course, such that the drive train is stabilized both laterally and upwards. Axially soft elastomers can be used as rubber dampers for such bearings, e.g. in the form of elastomer bushes which form the contact between the gear or a drive train component and the respective bearing support or the respective bearing ring.

A three-point mounting can comprise e.g. a main bearing and a gear support: the main bearing features a bearing ring which encloses a shaft of the drive train, i.e. a drive train component. The main bearing therefore absorbs both axial and radial forces. The gear support partially encloses a speed-transforming gear from both sides, i.e. in a horizontal direction and transversely relative to the axis of the drive train. It is so designed as to be axially mobile and therefore also absorbs torsional forces. This bearing is also used for the equalization of both pitch and yawing moments. A four-point mounting comprises a second bearing, which encompasses a shaft of the drive train and therefore offers the advantage of increased system stability due to additional absorption of axial forces.

In addition to this passive equalization of oscillations by means of bearings, provision can also be made for active oscillation damping. To this end, provision can be made at the bearings to exert active forces on the drive train or on other wind turbine components connected to the drive train, which active forces counteract the oscillations of the drive train or the components connected to the drive train. However, such active damping components require additional structural space within the cabin of the wind turbine, as well as being expensive to provide and maintenance-intensive. A further type of active oscillation damping is effected by means of converters, i.e. electronic components. By selectively regulating a converter, it is possible to decrease or increase loads from the generator side. Control of the converter for the purpose of oscillation damping is therefore possible and is currently also realized; however, it reduces the efficiency of the energy production and also introduces an additional factor of influence into the control of the converter.

SUMMARY OF INVENTION

Against this background, the present invention addresses the problem of providing an improved means of oscillation damping, which preferably involves in particular at most modest additional installation or maintenance effort and/or preferably results in increased damping efficiency, preferably in particular offering greater accuracy of effect, in comparison with purely passive oscillation damping.

This problem is solved by a method and a wind turbine, and by the use of a braking device as claimed in the claims.

Accordingly, the method of the type cited in the introduction is inventively developed in that parameter values representing an oscillation of the drive train are calculated and, on the basis of the calculated parameter values, damping forces which counteract the oscillation of the drive train are exerted in a controlled manner on the drive train using a braking device.

Representative parameter values, e.g. frequencies and amplitudes of an oscillation curve, can be derived from the oscillations of the drive train. Conversely, it can also be said that specific parameter values also represent the oscillation characteristics of the drive train. Said parameter values include inter alia the rotation speed and the rotation moment of the drive train, wherein these can be used as a basis for indirectly deducing which forces are produced by the rotation of the drive train and could result in vibrations. In particular, the oscillation characteristics of the drive train are represented by those parameter values which are produced directly from a vibration measurement, i.e. can be calculated on the basis of a force measurement at the drive train, for example.

The examination of such suitable parameters is used in the context of the inventive method to draw conclusions relating to the oscillation characteristics, and therefrom to derive control instructions for an active oscillation damping device. The braking device of the wind turbine is now used according to the invention as an oscillation damping device or as part thereof.

It is actually necessary to perform braking of the drive train in various hazardous situations or critical operating situations of the wind turbine. This applies in particular when individual components of the wind turbine are out of operation and further damages could be caused by the rotational movement of the drive train. The same applies to maintenance situations in which the wind turbine is maintained by qualified staff. For this purpose, the qualified staff are usually situated in the cabin of the wind turbine, where they are hampered in the execution of their duties by the rotational movement of the drive train and at the same time seriously endangered by the enormous forces that are produced by this rotation. This means that as a rule the drive train must be fully braked and locked in the context of maintenance, in order to exclude any hazards or hindrances to the staff.

Complete or partial braking of the rotational movement of the drive train is also necessary in the case of extreme wind conditions, particularly storms or hurricanes. Only in this way can it be ensured that no damage is sustained by functional parts of the wind turbine, e.g. by the rotor or in the generator, in the case of high wind speeds.

Accordingly, wind turbines used for industrial purposes today to produce high levels of power, i.e. greater than 100 kW, are normally always equipped with braking devices which allow both partial and full braking of the rotational movement of the drive train. Such braking devices usually consist of at least one brake caliper comprising (in each case) at least one brake pad, wherein the brake caliper spans a brake disc in such a way that the brake pad can be pressed against the brake disc and therefore brakes the brake disc in its movement. For this purpose, the brake disc is firmly attached to a drive train component of the drive train of the wind turbine. It therefore rotates at the same rotation speed as the drive train component. Conversely, when its rotational movement is braked the drive train component is therefore braked at the same time.

The invention therefore takes advantage of the fact that an already existing functional components of the wind turbine, namely the braking device, is now additionally used to perform an active oscillation damping on the basis of the previously mentioned control instructions that are derived from the parameter values. In this case, the braking device can function as an additional active damping device, but also as the sole active damping device. Operation as a sole active damping device ensures that no significant additional measures are required for the installation of active oscillation damping, since at least the mechanical main component of the active oscillation damping, namely the braking device, is already present. It is necessary merely to adapt the control of the braking device, such that said braking device can be used as a brake and as an active damping device concurrently.

When generating control instructions for the braking device, it is possible in principle to distinguish between braking instructions and damping instructions. In this case, braking instructions are the control instructions that are used for selective braking of the rotation of the drive train by the braking device, whereas damping instructions are those control instructions which are used for the active oscillation damping. Coordination preferably takes place between the braking instructions and the damping instructions, such that interactions between braking and damping by the braking device are reciprocally considered in advance and/or during operation of the braking device. If the braking device is used to brake the drive train as a result of a braking instruction, the oscillation characteristics of the drive train could possibly be affected. Damping instructions can therefore be derived, these being correspondingly computed in advance or calculated concurrently with the braking process, such that the braking response of the braking device is immediately set during operation so as to actively counteract an increase of vibrations of the drive train. Conversely, active damping actions on the drive train by the braking device also produce a braking effect. If the drive train is to be braked in parallel with the oscillation damping, this braking effect can therefore be immediately included in the calculation of the braking force to be applied, in the context of a coordinated braking and damping process. Ultimately, by coordinating the braking and damping process that is effected by the braking device, the two types of control instructions can be superimposed in order thus to derive a combined braking/damping instruction. Such a superimposition can be done electronically or by means of reciprocal influence of forces from a plurality of mechanical actuators acting on the braking device, or using a combination of these two superimposition principles. In each case, the result of generating a combined braking/damping instruction is the input of a combined braking/damping force into the drive train.

The braking device is therefore used not only to perform braking of the drive train, but also to produce a selective and deliberate force effect for the purpose of oscillation damping to counteract oscillations of the drive train. The corresponding damping control instructions are therefore derived from the parameter values relating to the oscillation characteristics of the drive train. They control the braking device in such a way that it introduces precisely set forces into the drive train at specific defined times, wherein said forces counteract the oscillation characteristics of the drive train as derived from the parameter values.

The control instructions are generated in a control device (i.e. a control unit) which is situated in the wind turbine and/or connected to the wind turbine. Provision is therefore made for a control device which regulates a braking force and also actively counteracts vibrations or oscillations of at least one drive train component of the drive train during operation. The control device therefore performs a type of "braking and damping program" which, from the parameter measurements cited above, derives the control instructions that are suitable for braking the drive train component in a manner which counters the vibration frequency.

In addition to the active oscillation damping by the braking device, provision can also be made for passive oscillation damping, e.g. by means of corresponding mounting and suspension. This is preferred in terms of providing dual protection and increasing the damping effectiveness.

Correspondingly, a wind turbine according to the invention comprises a rotor and a generator, these being connected together via a drive train, and a braking device and a control device. During operation, on the basis of parameter values representing an oscillation of the drive train, the control device in this case derives control instructions for exerting damping forces on the drive train by means of the braking device, wherein said damping forces counteract the oscillation of the drive train in a controlled manner.

The control device is therefore designed in such a way that it derives control instructions from the parameter values in accordance with the inventive method, wherein said control instructions are used for the selective control of the braking device for oscillation damping.

The invention also comprises the use of a braking device for the oscillation damping of a drive train in a wind turbine, which drive train connects a rotor to a generator, wherein parameter values representing an oscillation of the drive train are calculated and, on the basis of the calculated parameter values, damping forces are exerted in a controlled manner on the drive train by means of the braking device, wherein said damping forces counteract the oscillation of the drive train.

Further particularly advantageous embodiments and developments of the invention are derived from the dependent claims and from the following description. In this case, the inventive method and/or the inventive use can also be developed according to the dependent claims relating to the wind turbine and vice versa.

The control of the braking effect of braking devices in wind turbines is currently transmitted by mechanical transmission systems, hydraulically or pneumatically as a rule. Other mechanical transmission systems are also conceivable, e.g. connecting rods and/or toothed gears and/or cable control or even via direct human intervention. The control of the braking device is preferably done electronically. Electronic control instructions are therefore generated before being transmitted via transmission lines directly to an actuator where they can be implemented by setting the position of the braking device accordingly. This removes the need for indirect transmission, e.g. by means of hydraulic transmission fluids with corresponding susceptibility to error and maintenance and longer response times. The electronic control and triggering instead makes it possible also to achieve very finely coordinated (e.g. pulsing) braking and damping effects, wherein these can be achieved practically in real time and specifically in the millisecond range. Using a purely electronic regulating system, it is also possible to realize a closed control circuit, wherein a control device for electronically regulating a braking force is connected to (or comprises) an analysis unit which processes the braking and/or damping measured signals from a measurement of the braking and/or damping effect, such that the results of this signal processing can be used by the control device to derive refined control instructions for regulating a braking and/damping force. Provision is therefore made here for a self-regulating system which, despite the wear that inevitably occurs when using braking systems, allows a braking and damping force to be set precisely at all times, even during live operation of the braking device.

A braking device comprising a wedge brake is preferably used as a braking device, this being preferably controlled using electronic regulation of the braking force. The wind turbine according to the invention correspondingly features a braking device which comprises a wedge brake, preferably an electronic wedge brake.

The use of a wedge brake in the context of the braking device has several critical advantages over the prior art, which features conventional braking devices of the type described above (pneumatically or hydraulically controlled caliper brakes). In particular, it should be noted that less expenditure of force is generally required for braking and/or greater braking effect of the braking device can be achieved using the same force. This means that a more effective damping effect can also be achieved. Furthermore, a wedge brake can be controlled very precisely and does not require a hydraulic or pneumatic feed system, such that the above cited technical problems relating to such systems can be avoided. In particular, the filtering of transmission fluids and their cooling are no longer required. Instead, the wedge brake merely requires an actuator which moves the brake wedge in such a way that a desired braking and/or damping effect is produced, or in such a way that the transient braking and/or damping effect is reduced. With reference to the oscillation damping, in particular in connection with an electronic control of a wedge brake, a damping effect is produced which can be very finely tuned, and which can be exerted at precisely the time when a maximum or minimum is expected in the oscillation amplitude, such that maxima and/or minima can be reduced in magnitude accordingly.

Wedge brakes are being installed in automobiles today for trial purposes as a new type of brake system. In this context, reference can be made to e.g. the article by Bernd Gombert/Philipp Gutenberg: "Die elektronische Keilbremse" (*The Electronic Wedge Brake*), Automobiltechnische Zeitschrift 11/08, volume 108, November 2006, pages 904-912. This article also provides a comparison between conventional hydraulic brake systems and an electronic wedge brake—for brake systems in the field of automotive applications in each case. The article states in summary that the electronic wedge brake requires less expenditure of force and hence less energy for the purpose of achieving the same braking force as other automotive brake systems.

The use of wedge brakes in the context of wind turbines is not known as yet. In addition to the above cited advantages, their use in the field of wind turbines is also particularly effective because the magnitudes of the forces occurring and the heat that is potentially generated by frictional forces are significantly greater than for applications in a passenger vehicle. In contrast with motor vehicles, the braking in a wind turbine must moreover take place fully automatically and without human readjustment, whereas the actuator for the operation of the brake in the automobile is effectively human, specifically the driver. The same applies to the use of a wedge brake for oscillation damping. Trials undertaken by the inventor reveal that the operation of wedge brakes in the field of wind turbines is so reliable that they are eminently suitable for use there, wherein the advantages are even more numerous in this large-scale application: Firstly, the problems described above in relation to braking devices as per the prior art are considerably more acute than for technical applications having the magnitude of internal combustion engines producing approximately 100 kW, since wind turbines of contemporary design usually have a nominal power of more than 1 MW. Secondly, due to the size of the installation, a considerably larger structural space is available for the braking device, whereby it is effectively possible to use wedge brakes of a simpler construction design and even contribute to a space-saving effect. The brake discs in wind turbines are correspondingly much larger, for example, and therefore offer a larger contact surface for the brake wedge of the wedge brake than is the case in the automobile engine compartment. Thirdly, the role of the transmission of force from the actuator to the actual brake is considerably more important than in automotive applications. Finally, by virtue of its susceptibility to control that is considerably more precise, the wedge brake even offers the particularly effective possibility of counteracting vibrations in a damping manner as an additional effect.

In an embodiment that is particularly conducive to achieving the objective, provision is made for the control instructions for triggering the braking device for the purpose of activating the damping forces to be derived as a function of resonance frequencies of components of the wind turbine. To this end, the resonance frequencies are calculated before the wind turbine is started up, preferably by means of simulation and/or measurements, and/or during live operation of the wind turbine. A prototype of a wind turbine of the same structural type or of an essentially similar structural type can be used as a basis for measuring resonance frequencies before the wind turbine is started up.

In this case, the resonance frequencies can comprise both a dominant resonance frequency and its upper frequencies. They can relate to individual components of the wind turbine, e.g. a speed-transforming gear, the generator, the drive train or the cabin, though the term "component" also encompasses the complete wind turbine with its resonance frequencies. By means of advance calculation and/or by means of calculating the resonance frequencies during live operation of the turbine (including at specific predefined test intervals), the resonance frequencies can be identified and then counteracted in a very selective manner. It is thus possible to prevent "hunting" of individual components and/or of the complete wind turbine system due to vibrations of the drive train, wherein this has proven particularly effective in the prevention of technical problems: it is precisely by preventing such hunting that particularly pronounced movements can be prevented, thereby allowing the wear and material fatigue to be actively reduced to greatest effect.

In the operation of a wind turbine, a fundamental distinction is made between thrust operating mode and reverse thrust operating mode: In the case of reverse thrust operating mode, the wind drives the rotor with such strength that forces from the rotor act on and drive the drive train. The opposite principle applies in the case of thrust operating mode, i.e. the inertia of the rotating drive train (and the connected rotating parts in the generator and possibly in a speed-transforming gear) causes the rotor to be driven by the drive train, such that the rotor effectively reaches a rotation speed that is not achieved as a result of the prevailing wind, but as a result of the forces from the drive train. By virtue of its inert movement, the drive train continues the rotation of the rotor even though insufficient wind is actually present for this rotor movement. Therefore other forces also appear in the drive train during thrust operation, particularly in a speed-transforming gear if this is present.

In such speed-transforming gears, transmission currently takes place between helical toothed gearwheels. Therefore at every wheel position of two toothed gearwheels relative to each other, a larger contact surface between the teeth is produced than in the case of straight-toothed gearwheels. By virtue of this sloping of the teeth, torsional forces are supported to some extent both axially and radially. At the instant when the reverse thrust operating mode of the wind turbine becomes a thrust operating mode, different relationships of force occur between the toothed gearwheels, since the other contact surfaces (those not touching during the reverse thrust operating mode) of the respective teeth now engage. The gear and the drive train experience a hysteresis which is followed by a transition to an inverted deformation of the drive train, due to reversing torsional forces, and to an inverted pitch and yawing moment of the drive train. During this transition process, which is slower due to the hysteresis, mechanical shocks and undesired oscillations are produced. Conversely, in the case of a transition from thrust to reverse thrust operating mode, such behavior is also evident in reverse, though here the transition of forces usually occurs more quickly: The rotor generally experiences an approximately continuous supply of energy from the wind, whereas in the thrust operating mode only residual energy from the movement of the drive train and the connected components is consumed. The continuous supply of energy to the rotor also has the effect that the system comprising rotor, drive train, gear and generator stabilizes itself more quickly again and therefore vibrations are equalized relatively quickly—quasi autonomously (supported by passive damping mechanisms if applicable).

In the light of this, the inventor has recognized it to be particularly advantageous if the damping forces are exerted during a thrust operating mode of the drive train, and preferably exclusively during a thrust operating mode of the drive train. This also has the advantage that the efficiency of the wind turbine is hardly reduced by the active damping, more energy naturally being consumed if the active damping takes place during the reverse thrust operating mode. In this context, it is particularly advantageous if an identification signal for detecting a transition from reverse thrust to thrust operating mode is derived from the representative parameter values. Likewise, an identification signal for detecting a transition from thrust to reverse thrust operating mode is preferably also derived. These identification signals are subsequently preferably used to adapt the control instructions to the braking device to the thrust or reverse thrust operating mode respectively. Therefore a different damping program runs according to whether the wind turbine is in the reverse thrust operating mode or in the thrust operating mode. Such a damping program can also specifically provide for no active damping to be performed by the braking device in the thrust operating mode, or for active damping in the reverse thrust operating mode only in emergencies, e.g. if a critical oscillation amplitude is reached at a resonance frequency.

The state of the braking device itself can be used as an influence factor as part of the oscillation damping using a braking device. The brake shoes wear out and the brake disc of the braking device experiences irregular deformations, wear and deposits due to corrosion over time. In particular, emergency braking can cause a brake disc to reach temperatures of 400° to 600° C. During cooling, which is not locally uniform, the brake disc is therefore deformed by chemical and physical effects. Asymmetries are produced. In the light of this, provision is preferably made for varying an application force on a brake disc of the braking device as a function of deviations in the uniformity of the brake disc. In this case, a parameter value and/or a measured signal representing the degree of uniformity of the brake disc is sampled and used as a basis for varying the control instructions for brake control depending on the state of the brake disc.

The parameter values are preferably calculated on the basis of sensor signals from a number of measuring sensors, particularly preferably from vibration sensors for measuring vibrations at components of the wind turbine and/or from force sensors for measuring the damping forces that are exerted. The parameter values can be derived from the sensor signals or the sensor signals can be used directly as parameter values in this case. The measuring sensors can be arranged outside the wind turbine, for example, but are preferably arranged therein, i.e. closer to the drive train oscillations to be calculated and protected from external influences due to weather and other external effects. In particular, the measuring sensors are preferably located at the drive train and/or at a wind turbine component that is connected to the drive train, e.g. the generator, a speed-transforming gear or the rotor. The measuring sensors can also comprise sensors for measuring the rotation moment of the drive train and/or its rotation speed, wherein such measuring sensors can also supply e.g. parameter values from which it is possible to infer whether the wind turbine is currently in the thrust operating mode or in the reverse thrust operating mode. The measurement of the exerted damping forces allows a feedback of parameter values into the system, wherein said parameter values help to show the effect of the damping measures. Other measuring sensors (used additionally or alternatively) comprise sensors for measuring the wind speed, wind direction and turbulence, and for displacement measurement (e.g. for calculating the axial displacement of the drive train and/or individual drive train components or of the gear housing of a speed-transforming gear). On the basis of the parameter values that are derived from the respective measurement, it is then possible to draw inferences regarding the oscillation characteristics of the drive train.

The precise tuning of the damping forces can also be refined by means of a precontrol. This means that control instructions for exerting the damping forces are therefore generated on the basis of precontrol signals that are derived from the parameter values. Such precontrol signals are based on a forecast of the oscillation development of the drive train on the basis of parameter development values, i.e. values that represent the development of values of an observed parameter and/or a combination of parameters. This allows a relatively satisfactory advance computation of future developments of the oscillation of the drive train for a short time. On the basis of parameter values for parameters such as rotation speeds, rotation moments, state and concentricity of the brake disc, desired values are calculated in accordance with a current damping control instruction; the precontrol also receives parameter values from the environment, such that a forecast of the subsequent development of parameter values becomes possible as an effect of the damping. This results in a desired-state variable, which is fed into a return circuit and compared with actual-state variables. The control does not react immediately thereupon, but has expected values or guide signals which were computed in advance as a basis and which can then be repeatedly balanced with actual measured values and/or parameter values in the context of fine tuning within a closed control loop. The control becomes faster and more accurate as a result.

Such a state estimate can be performed by means of a Kalman filter, for example. Using this filter, it is possible to draw inferences relating to the state of many of the systems assigned to the technologies, sciences and management, merely on the basis of erroneous observations. Simply stated, the Kalman filter is used to remove the faults caused by measuring devices. Both the mathematical structure of the underlying dynamic system and that of the measurement distortions must be known in this case.

It is fundamentally possible to derive control instructions directly from calculated parameter values, e.g. from values relating to a force measurement at the drive train, which control instructions result in a force effect by means of the braking device directly against the calculated forces. The parameter values are preferably used for calculating a curve of oscillations to be damped, and the damping forces are preferably exerted in a manner that is diametrically opposed in terms of direction and/or strength and/or frequency (preferably in terms of all three of these characteristic variables) to the calculated curve. Control instructions are derived from the curve accordingly, and preferably have the shape of a directly opposed curve.

A particularly preferred application area of the invention relates to those wind turbines in which the drive train comprises a first shaft and a second shaft as drive train components, said shafts being connected together via a speed-transforming gear. Active damping is particularly advantageous here, because the speed-transforming gear generates additional high-frequency oscillations as described above. In this case, the braking device is preferably arranged in the region of the second shaft, i.e. the shaft that leads from the speed-transforming gear towards the generator. According to experience, the greatest oscillation amplitudes along the entire drive train occur here, and therefore application of the active damping directly at the point of use of the braking device can be particularly effective.

The speed-transforming gear translates the low rotation speed of the first shaft into higher rotation speeds of the second shaft, such that lighter generators can be driven and the braking of the drive train can be more finely tuned. The braking and damping of a shaft that is rotating faster (in comparison with the rotation speed of the rotor and a first shaft that is connected directly thereto) can be performed more precisely because the braking effect (in absolute values of the speed reduction) can be measured more easily than is the case for slow rotating shafts. The same applies to the damping effect with reference to absolute values of the damping force effect. Moreover, the second shaft is therefore less inert than the slow running first shaft.

In wind turbines featuring a wedge brake, the wedge brake preferably comprises the following components:
- a brake disc which is connected to a drive train component that is to be braked,
- a permanently installed retaining structure which is arranged in the region of at least one flat side of the brake disc and features a guide surface,
- a brake wedge that is mounted on the guide surface and has a surface which faces towards the guide surface and whose shape corresponds to that of the guide surface, an actuator which moves the brake wedge along the guide surface during operation.

The brake wedge can be either directly or indirectly in contact with the guide surface. For example, it can be connected to the guide surface via rollers or slide along it by means of a suitable sliding agent.

The brake wedge preferably comprises a brake pad, this being attached to that side of the brake wedge which is opposite to the guide surface in the direction of the brake disc, wherein said brake pad is pressed onto the brake disc during the braking operating mode.

Such an arrangement of the components of a wedge brake is easy to assemble (and can possibly be installed as an upgrade in existing braking devices) and straightforward to use. In particular, the guiding of the brake wedge along the guide surface has the consequence that the braking effect of the wedge brake can be set in advance by the shape of brake wedge and guide surface. For example, the shape of the guide surface and/or of the brake wedge can be configured such that a movement of the brake wedge does not produce a linear increase in force, but an increase in force that is exponential or conversely rises more slowly.

A wedge brake comprising the described components is advantageously operated by an electric motor as an actuator, wherein said electric motor is preferably regulated by an electronic control device. It is therefore possible to use a system that is as far as possible electronic electrical, in which only the previously described components of the braking device are mechanically embodied and the regulation takes place entirely under electronic control.

Concerning the shape of the guide surface of the wedge brake, a first basic alternative provides for said guide surface to be plane and aligned obliquely relative to an axis of rotation of the drive train component that is to be braked. In this case, the guide surface preferably runs steeply towards a brake disc that is to be braked. In a variation of this first alternative, the guide surface is not plane, but describes a course that rises or falls uniformly (preferably very uniformly) in cross section in the manner of a crank. This produces the above described effect of a non-linear intensification of the braking force when the position of the brake wedge is changed. The brake wedge preferably has a shape which corresponds to this shape of the guide surface.

A second basic alternative consists of a guide surface and/or a surface of the brake wedge in the form of a zigzag, e.g. in the form of a W. Provision is preferably made for both the guide surface and the surface of the brake wedge to be similarly shaped in the form of a zigzag. Such a zigzag shape is illustrated e.g. in FIG. 1 of the article by Roberts, Richard et al.: "Testing the Mechatronic Wedge Brake" SAE paper 2004-01-2766 and is described in the accompanying text. The teaching from this description is correspondingly incorporated into this patent application as teaching.

The zigzag shape does not necessarily have to be angular, but can also be rounded. In other words, the guide surface and/or the surface of the brake wedge features bumps and depressions, such that the brake wedge can be moved against the guide surface in two different directions, from an initial zero point, in order to achieve an increase in braking force. This alternative allows closer contact between the guide surface and the brake wedge. As a result of this, a system can be realized that is more compact, since it is inherently more stable because the brake wedge cannot slip away completely from the guide surface in one direction.

In a particularly advantageous development, a wind turbine according to the invention comprises a plurality of braking devices. In this case, a braking device can be designed and/or controlled in such a way that it is used solely for braking the drive train. Such a braking device is therefore based on a simpler control model. Other braking devices can then be designed and/or correspondingly controlled exclusively or inter alia for oscillation damping. However, provision is preferably made for at least two such braking devices, and preferably in particular all braking devices, to be designed and/or controlled in such a way that they can be used for oscillation damping.

In the context of the invention, the use of a plurality of braking devices offers the particular advantage that a plurality of braking devices can better relieve the load on each other and hence experience less strain and wear during operation, e.g. in the case of emergency braking. This results in fewer irregularities in the brake discs and therefore effectively allows greater precision when coordinating the damping forces that can be exerted by each braking device. Furthermore, the active damping effect can also be varied locally, such that damping forces can be introduced into the drive train in particular at those locations where damping is particularly applicable. Therefore if the oscillation amplitude is particularly high at a location, provision is preferably made for using primarily those braking devices which are closest to this location for the purpose of damping. The braking devices can moreover be arranged differently, such that e.g. one braking device introduces a damping force (and braking force) from one side and another braking device from above. As a consequence of this, oscillations having different directions of oscillation can also be damped as effectively as possible.

In the light of this, it is a further aim of the inventor for at least two of the braking devices, and preferably all of the braking devices, to be triggered independently of each other. In this context, independent triggering means that different control instructions are directed to the individual braking devices. Nonetheless, these control instructions easily can—indeed preferably do—form part of an overall context, thereby allowing coordination of the control instructions at the individual braking devices. This means that a "concerted" damping action of the independent braking devices is possible, wherein the damping forces accumulate in quantity and direction to form a total damping force of all braking devices, said total damping force corresponding to the damping effect that is desired by the control system.

It should also be noted that a braking device can additionally be used for damping in the case of severe shock oscillations when strong forces suddenly occur, e.g. in the event of a power failure of the wind turbine. By virtue of the damping braking action, the braking device prevents the cabin and the tower of the wind turbine from moving against the wind, or prevents the tower from twisting excessively (depending on the wind direction). The effect of the rotor is similar to that of an aircraft propeller in this case. A counter-moment is indirectly obtained by the damping actions of the braking device, and significantly reduces the movement of cabin and tower and hence also the torsion of the latter.

BRIEF DESCRIPTION OF THE DRAWINGS

The invention is described again in greater detail below with reference to exemplary embodiments and to the appended figures, in which the same components are denoted by identical reference numerals in the different figures, and in which.

DETAILED DESCRIPTION OF INVENTION

Figure 1:
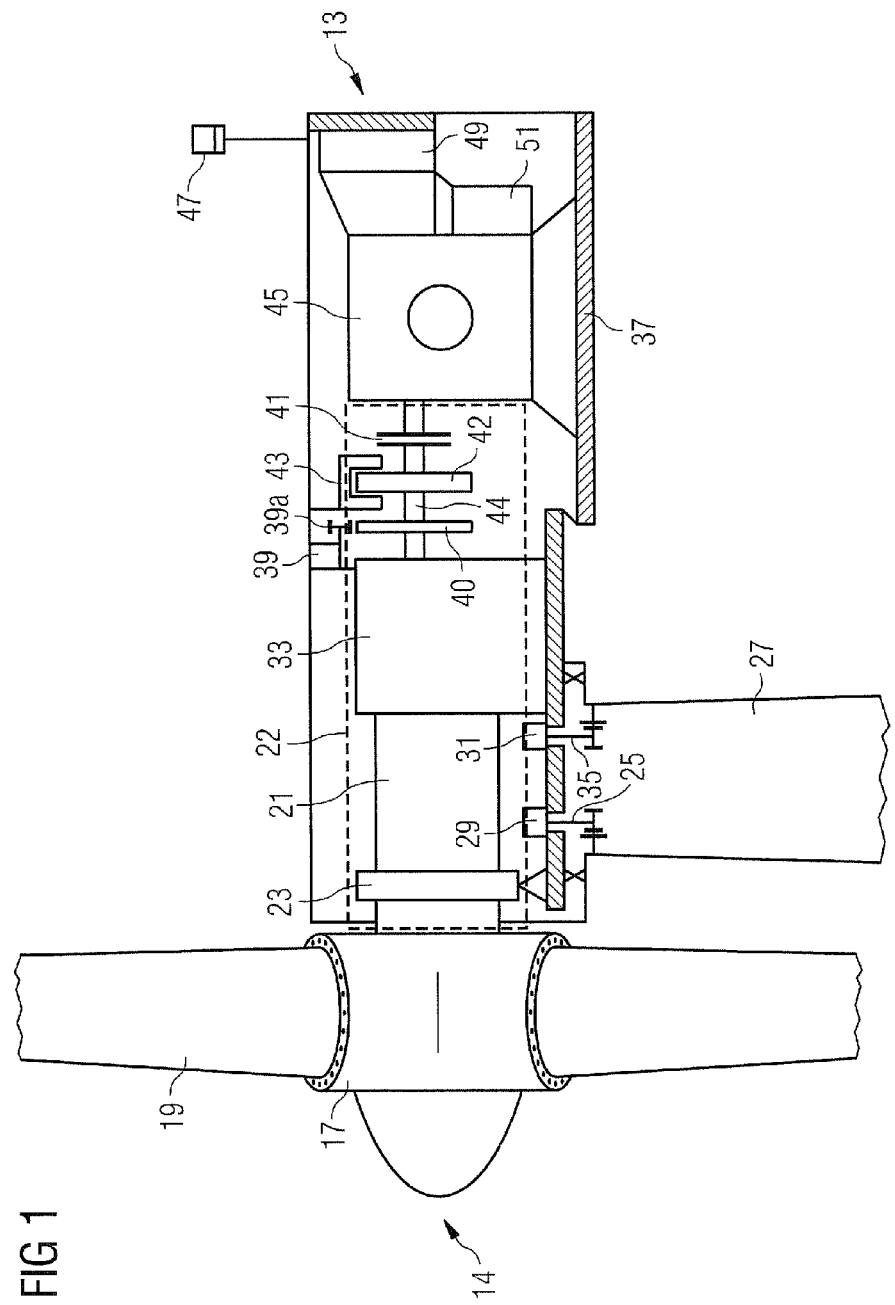
FIG. 1 shows a side view of an embodiment of a wind turbine according to the invention, the cabin of said wind turbine being in an open state.

FIG. 1 shows a wind turbine 13 according to an embodiment of the invention. On its front side, which faces the wind, it features a rotor 14 comprising a plurality of rotor blades 19. These are connected to a hub 17. A first shaft 21 leads from the hub 17 into the interior of the cabin 37 of the wind turbine 13. Said first shaft is mounted in the cabin 37 via an elastic main mounting 23 and a first yoke 25 and a second yoke 35 (whose positions can be adjusted by means of motors 29, 31).

A gear 33 converts the rotation of the first shaft 21 into a rotation of a second shaft 44, wherein the second shaft 44 is arranged on that side of the gear 33 which faces away from the second shaft 21. The second shaft 44 leads to a generator 45, in which current is obtained from the rotational energy of the second shaft 44. A coupling 41 is used to couple the second shaft 44 in or out, in order that in hazardous situations the generator 45 can be decoupled from the rotation of the second shaft 44. The first shaft 21 and the second shaft 44 together form part of a drive train 22. The generator 45 is cooled by means of a water cooler 49 and an additional ventilator 51. An oil cooler can also be used instead of the water cooler 49.

The cabin 37 is rotatably mounted on a tower 27. A meteorological sensor 47 is attached to the outside of the cabin 37, providing meteorological data concerning e.g. the wind situation, temperatures, cloud and visibility conditions, etc.

Located in the region of the second shaft 44 is a servomotor 39, which engages with a toothed wheel 40 that is connected to the second shaft 44. A brake disc 42 is also connected to the second shaft 44 and is braked by a braking device 43.

The braking device 43 is so designed as to exert controlled damping forces on the drive train 22, wherein said damping counteract unwanted oscillations of the drive train. This operation is described in greater detail with reference to the FIGS. 3 to 6.

Figure 2:
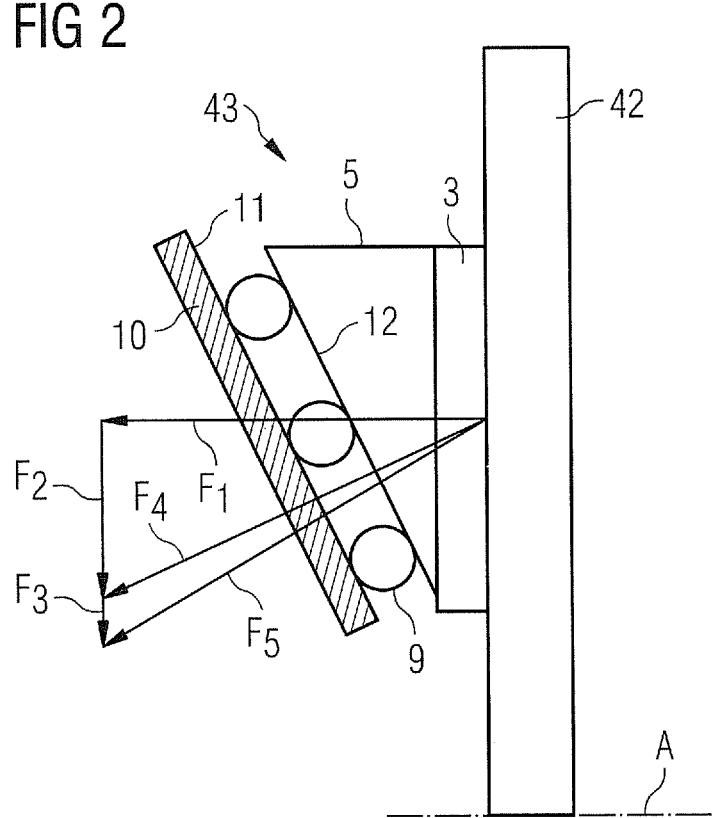
FIG. 2 shows a greatly simplified schematic representation of a wedge brake in cross section.

In order to demonstrate the operation of wedge brakes, FIG. 2 shows a wedge brake 43 in a schematic representation as a side view. It has a brake wedge 5, which can move over floating rollers 9 along a guide plane 11 of a retaining structure 10. A surface or bearing surface 12 of the brake wedge 5 is aligned in the direction of the guide plane 11, along which the floating rollers 9 are mounted. A brake pad 3 is situated on the opposite side of the brake wedge 5 to the bearing surface 12, and is aligned in the direction of a brake disc 42. The brake disc 42 rotates about an axis A, relative to which the guide plane 11 is obliquely aligned, i.e. at an angle unequal to 180° and unequal to 90°. This means that the brake disc 42 rotates in the viewing direction of the observer.

When the brake wedge 5 with the brake pad 3 lies against the brake disc 42, a normal force $F_1$ is present at the brake disc 42 and a frictional force $F_2$ is present in a tangential direction relative to the normal force $F_1$. A combined braking force $F_4$ is produced in a triangle from the combination of these two forces $F_1$, $F_2$. The braking of the brake disc 42 takes place within this equilibrium of forces. If the brake wedge 5 is now pushed further in the direction of the axis A by an actuator force $F_3$, a stronger braking force $F_5$ is produced thereby. By moving the brake wedge 5 in the direction of the axis of rotation A, it is therefore possible to achieve an increase in the braking force of the wedge brake 43. Although the braking force of the wedge brake 43 does not increase as much as the actuator force $F_3$ in this case, it is not necessary to apply any additional force in order to hold the brake wedge 5 in position after the brake wedge 5 has been moved. Instead, a new equilibrium of forces having a constant braking force $F_5$ is produced. The required actuator force $F_3$ is effectively dependent on the friction properties of the contact between the brake disc 42 and the brake pad 3. The wedge brake 43 has reached its optimal braking point when no additional actuator force $F_3$ is required to move the brake wedge 5 further in the direction of the axis A, in order thereby to achieve the relevant desired braking force. A control device which regulates the actuator force $F_3$ effectively aims to ensure that precisely this point is reached by achieving an equilibrium of the forces.

A wedge brake is preferably used in the context of the invention, though it is also possible to use other types of braking devices in principle.

Figure 3:
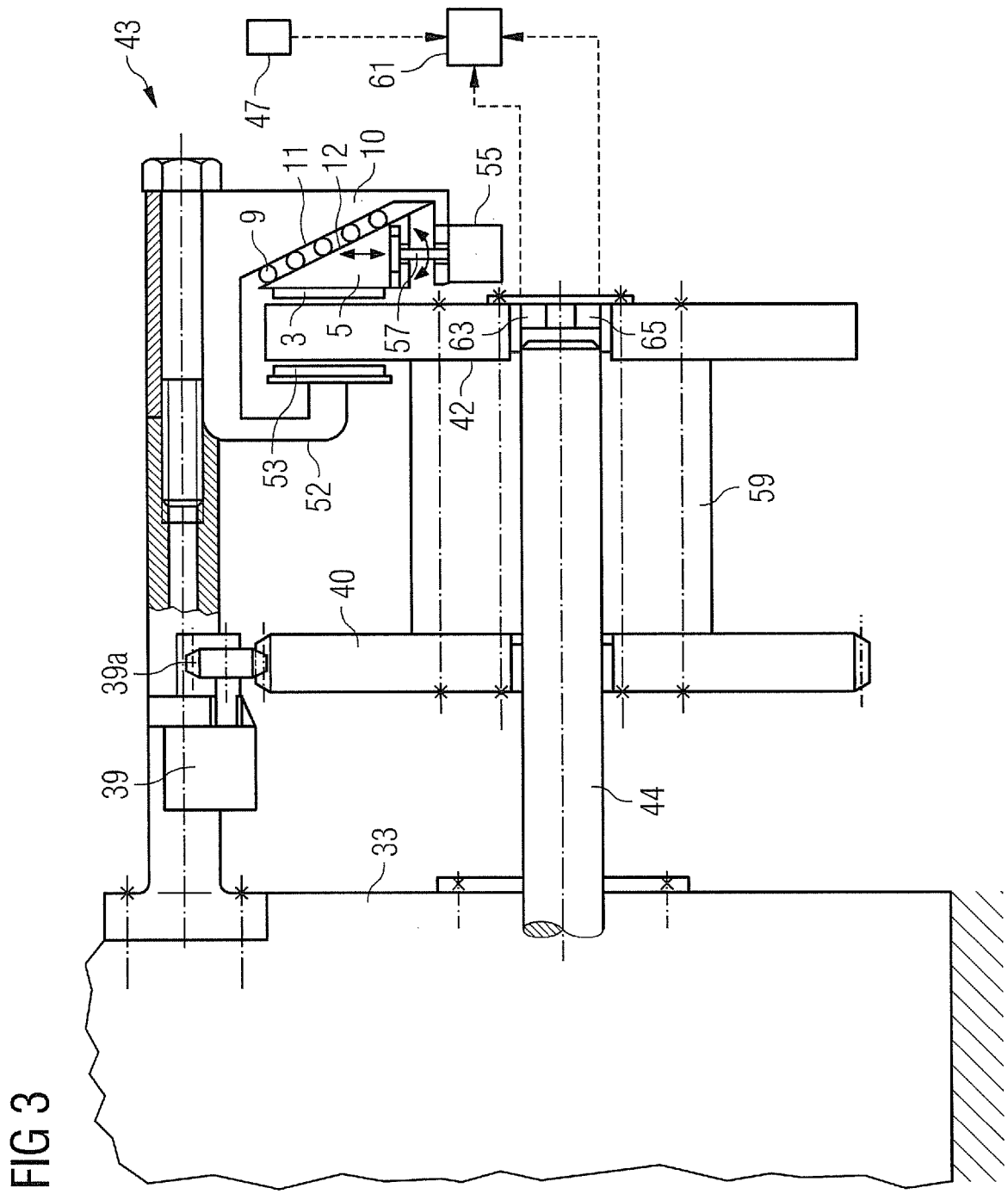
FIG. 3 shows a detailed view from FIG. 1 of parts of the drive train and the braking device of the wind turbine.

FIG. 3 shows the region of the second shaft 44 and in particular the braking device 43 from FIG. 1 in greater detail. Starting from the gear 33, the second shaft 44 leads in the direction of the generator 45 (not shown here). The toothed wheel 40 is connected to the servomotor 39, which engages with the toothed wheel 40 via a toothed wheel 39a. By virtue of the servomotor 39, the rotational position of the second shaft 44 can be adjusted in such a way that a locking device 59 can catch in the toothed wheel 40 at a specified locking position and hold it in place thus. The second shaft 44 is therefore held in place and cannot rotate, wherein this applies at the same time indirectly via the gear 33 to the first shaft 21. Arranged next in the direction of the generator 45 are a brake disc 42 and two sensors 63, 65 which measure both the rotation speed or rotation moment of the second shaft 44 and hence indirectly its vibrations, i.e. the detrimental oscillations that are to be damped in the context of the invention.

As mentioned above, the braking device 43 for damping the vibrations is realized as a wedge brake in the present exemplary embodiment. This means that a brake wedge 5 according to the principle illustrated in FIG. 2 is moved upwards and downwards along floating rollers 9 over a guide surface 51, in order to achieve the desired braking force $F_3$, $F_5$ (cf. FIG. 2) at the brake disc 42. In addition to the brake pad 3 already shown in FIG. 2, a second brake pad 53 is arranged on the opposite side to the brake pad 3 by virtue of a brake caliper 52, such that the displacement of the brake wedge 5 of the wedge brake 43 results in a type of clamping of the brake disc 42 between the (first) brake pad 3 and the second brake pad 53. An electrical servomotor 55 adjusts the position of the brake wedge 5 of the wedge brake 43 via an adjustment wheel 57, such that the desired braking force $F_3$, $F_5$ is achieved.

The servomotor 55 is controlled by a control device 61 which uses input data for this purpose, wherein said input data comes from sensors and in particular the rotation sensor 63, the vibration sensor 65 and the meteorological sensor 47, and wherein said input data is used to derive control instructions for inter alia the active damping of vibrations of the second shaft 44. Said input data consists of parameter values representing the oscillation characteristics of the drive train.

The data from these sensors can also provide information relating to the presence of hazardous situations which give grounds for the rotation speed of the second shaft 44 or of the entire drive train 22 to be reduced or brought to a complete standstill. In effect, the control device 61 can therefore set precisely the optimal transient braking and/or damping force of the wedge brake 43 as a function of this and other input data (e.g. measured data relating to the current braking effect of the wedge brake 43).

Figure 4:
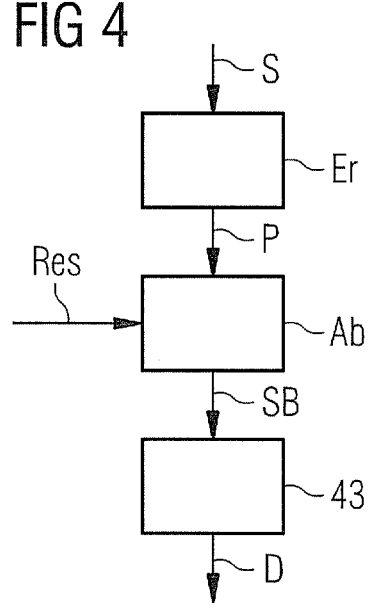
FIG. 4 shows a schematic block diagram depicting the flow of an oscillation damping method according to an embodiment of the invention.

FIG. 4 shows a schematic flow diagram of an oscillation damping method according to an embodiment of the invention. On the basis of oscillations S of the drive train 22 (cf. FIGS. 1 and 3), representative parameter values P can be calculated for these oscillations S. This can be done e.g. by means of the sensors 63, 65 (cf. FIG. 3). In a derivation step Ab, these parameter values P are sued to derive control instructions SB for oscillation damping of the oscillations S. Further inputs can include information relating to resonance frequencies Res of the drive train 22 or the wind turbine 13 or individual components thereof, i.e. information regarding the frequency ranges in which oscillations can cause particular damage in the wind turbine 13. The control instructions generated thus are forwarded to the braking device 43, activation of which causes damping forces D to be exerted on the drive train 22 and more specifically on the second shaft 44.

Figure 5:
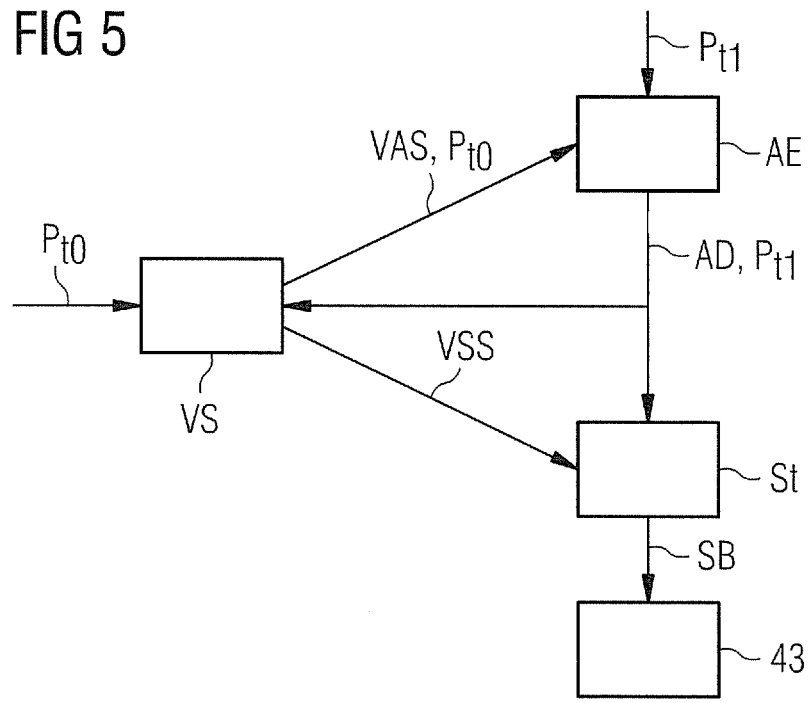
FIG. 5 shows a schematic block diagram depicting the flow of a control process of the braking device with precontrol, wherein such a control process can be used in the context of an oscillation damping method according to the invention.

FIG. 5 shows a schematic block diagram relating to the flow of a control process. Parameter values $P_{r0}$ that are requested at a first time point are input into a precontrol VS. These parameter values $P_{r0}$ comprise measured values for the rotation speed and/or the rotation moment of the second shaft 44, the rotation moment and the rotation speed of the rotor 14 and/or of the first shaft 21, or the wind speed, for example. They can also comprise measured values for pitch and yawing moments, the axial displacement of the drive train 22 (or individual components thereof), the disc state of the brake disc 42 and the transient clamping force of the braking device 43 (i.e. the force that is exerted on the brake disc 42), etc. On this basis, the precontrol VS derives precontrol signals VSS which contain information relating to the approximate braking force that is to be exerted by the braking device 43 at a second (subsequent) time point. These precontrol signals VSS are fed into a control St which generates control instructions SB therefrom and forwards these to the braking device 43 for implementation.

In addition, the first parameter values $P_{r0}$ and precontrol balancing signals VAS are forwarded to a balancing unit AE. The precontrol balancing signals VAS contain information from the precontrol VS, wherein said information indicates which state inferences the precontrol VS has drawn from the first parameter values $P_{r0}$ relating to the oscillation state of the drive train 22, in particular approximately which parameter values are next expected after a damping action by the braking device 43 has taken place. Similar second parameter values $P_{r1}$ are fed into the balancing unit AE at the second time point, specifically after the first activation of the damping effect of the braking device 43. The balancing unit AE compares the second parameter values $P_{r1}$ with the precontrol balancing signals VAS and/or with the first parameter values $P_{r0}$ and generates balancing data AD therefrom. It feeds this and the second parameter values $P_{r1}$ back to the precontrol VS, which draws inferences therefrom in relation to the subsequent development of the oscillations S in the drive train 22. The balancing data AD is likewise forwarded to the control St, such that the control St likewise draws inferences therefrom in relation to the damping response that will be required in the future.

This circuit is continuously repeated, whereby continuously refined regulation of the damping force of the braking device 43 can be achieved in a closed loop.

Figure 6:
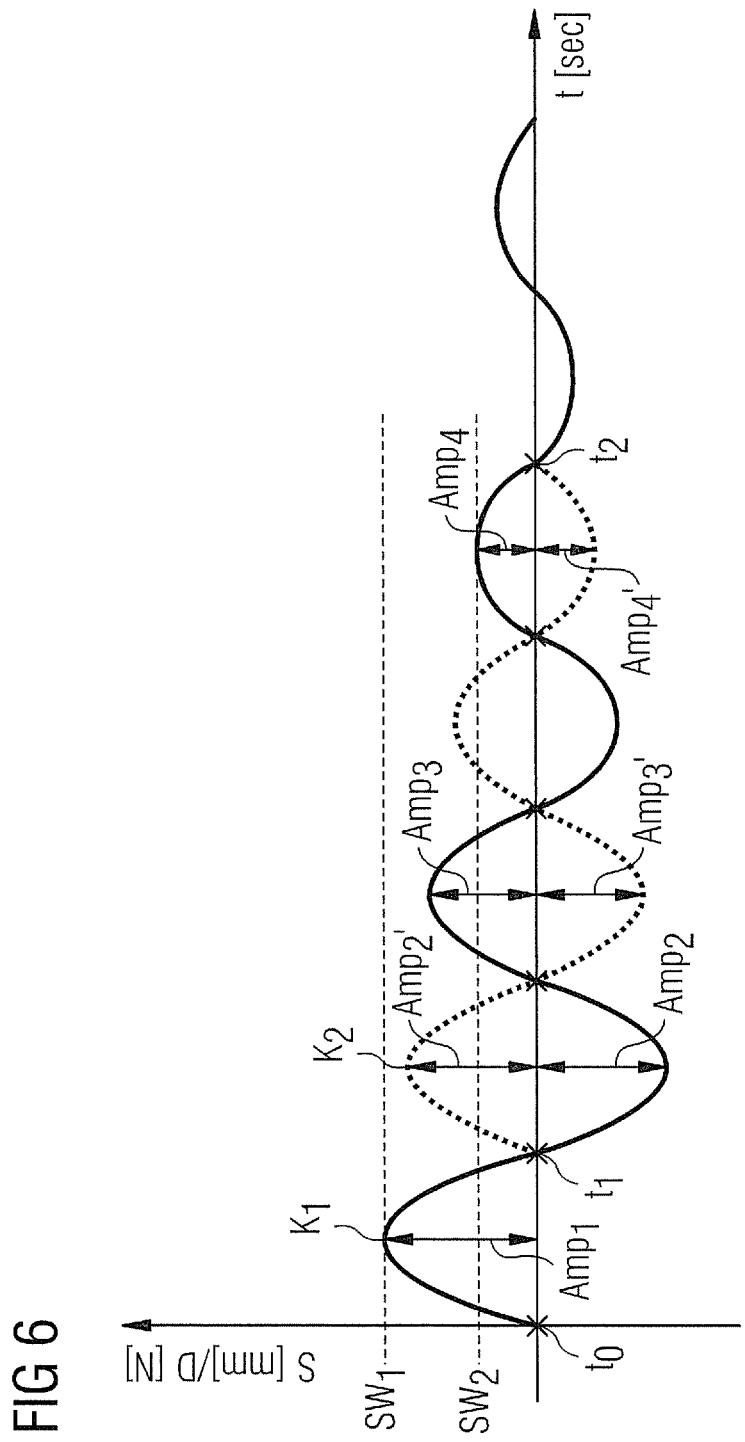
FIG. 6 shows a schematic control curve in relation to an oscillation curve of a drive train, wherein such a control curve can be derived in the context of an oscillation damping method according to the invention.

FIG. 6 shows a schematic control curve $K_2$, the like of which can be derived in the context of an oscillation damping method according to the invention, in relation to a highly schematic oscillation curve $K_1$ of the drive train 22, said curves being plotted over the time t (in seconds, without scaling). With reference to the oscillation curve $K_1$, the y-coordinate shows the distance s (in mm, without scaling) that is covered by the oscillations S. With reference to the control curve $K_2$, it shows the damping force D (in N, without scaling) that is derived from the control instructions. The oscillation curve $K_1$ is derived from parameter values P as explained above with reference to FIG. 4.

The oscillation curve $K_1$ is shown in a greatly simplified form here as a sinusoidal curve with a fixed frequency and without any irregularities. In practice, it generally deviates markedly from such an ideally typical course, primarily because a plurality of oscillation types (e.g. axial and radial and torsional oscillations) are superimposed. This also means that the corresponding control curve $K_2$ will reflect this complexity. The explanations relating to the oscillation characteristics and control response are therefore likewise to be understood as schematically simplified.

At the outset, at a time point $t_0$, the oscillation S is not yet actively damped. In a critical frequency range, e.g. a resonance frequency of the cabin 37, the oscillation curve $K_1$ therefore has a relatively high first amplitude $Amp_1$, which is higher than an upper threshold value $SW_1$. As a result of reaching this threshold value $SW_1$, an alarm state is triggered which signifies that active oscillation damping is to be initiated.

At a time point $t_1$, i.e. directly after the critical frequency and the high first amplitude $Amp_1$ are detected, the oscillation S is therefore actively counteracted by means of the braking device 42. The control curve $K_2$ in this case describes an asymmetrically mirrored course along the t-axis (i.e. the oscillation zero point of the oscillation curve $K_1$), whereby the damping force D is exerted precisely counter to the course of the oscillation curve $K_1$, wherein the level of the damping force D increases to the same extent that the level of the deviation of the drive train 22 from the oscillation zero point as per oscillation curve $K_1$ increases or decreases. The amplitudes $Amp_2$, $Amp_3$, $Amp_4$ of the oscillation curve $K_1$, which are calculated after the time point $t_1$, are therefore lower than the first amplitude $Amp_1$.

The amplitudes $Amp_{2'}$, $Amp_{3'}$, $Amp_{4'}$ of the damping curve $K_2$ correspond to the amplitudes $Amp_2$, $Amp_3$, $Amp_4$ of the oscillation curve $K_1$ to the extent that they decrease in proportion to the amplitudes $Amp_2$, $Amp_3$, $Amp_4$ of the oscillation curve $K_1$. By virtue of the damping, the resulting level of the amplitude $Amp_4$ lies below a lower threshold value $SW_2$. This means that the previously triggered alarm state can now be cancelled. The active damping by means of the braking device 43 is therefore stopped with effect from a time point $t_2$, i.e. directly after the lower threshold value $SW_2$ is no longer reached. The oscillation curve $K_1$ continues along desired paths with a lower amplitude until the upper threshold value $SW_1$ is reached again. The damping is therefore performed solely by the passive dampers in the wind turbine 13, i.e. by the main mounting 23, for example.

In conclusion, it is again noted that the foregoing detailed description of the method, the wind turbine and its components are merely exemplary embodiments which can be modified in all variety of ways by a person skilled in the art without thereby departing from the scope of the invention.

Furthermore, use of the indefinite article "a" or "an" does not exclude multiple occurrence of the feature concerned. Moreover, "units" can consist of one or more components, including components that are so arranged as to be physically distributed.

The invention claimed is:

1. A wind turbine, comprising:
   a rotor;
   a generator;
   a drive train that connects the rotor to the generator;
   a braking device that damps an oscillation of the drive train using a control instruction; and
   a control device that:
      calculates parameter values representing the oscillation of the drive train, and
      derives the control instruction for exerting damping forces on the drive train by the braking device,
   wherein the braking device comprises a wedge brake.

2. The wind turbine as claimed in claim 1, wherein the wedge brake is an electronic wedge brake.

3. The wind turbine as claimed in claim 1, wherein the drive train comprises a first shaft and a second shaft being connected together via a speed-transforming gear.

4. The wind turbine as claimed in claim 3, wherein the braking device is arranged in a region of the second shaft.

5. A method for damping an oscillation of a drive train connecting a rotor to a generator in a wind turbine, comprising:
   calculating parameter values representing the oscillation of the drive train; and
   exerting damping forces on the drive train to damp the oscillation of the drive train by a braking device based on the calculated parameter values,
   wherein the braking device comprises a wedge brake and a braking force of the wedge brake is controlled by an electronic regulation.

6. The method as claimed in claim 5, wherein the braking device electronically controls the exertion of the damping forces.

7. The method as claimed in claim 5,
   wherein the braking device is triggered by a control instruction derived as a function of resonance frequencies of components of the wind turbine, and
   wherein the resonance frequencies are calculated before the wind turbine is started up by simulation and/or measurements, and/or are calculated during live operation of the wind turbine.

8. The method as claimed in claim 5, wherein the damping forces are exerted during a thrust operating mode of the drive train.

9. The method as claimed in claim 5, wherein an application force on a brake disc of the braking device is varied as a function of deviations in uniformity of the brake disc.

10. The method as claimed in claim 5, wherein a control instruction for exerting the damping forces is generated based on a precontrol signal derived from the parameter values.

11. The method as claimed in claim 5,
   wherein a curve of the oscillation to be damped is calculated from the parameter values, and
   wherein the damping forces are exerted diametrically opposed to the calculated curve in terms of direction and/or strength and/or frequency.

12. The method as claimed in claim 5, wherein the parameter values are calculated based on sensor signals from a plurality of measuring sensors.

13. The method as claimed in claim 12, wherein the plurality of measuring sensors comprise vibration sensors for measuring vibrations at components of the wind turbine and/or force sensors for measuring the damping forces that are exerted.

* * * * *